9402X
I. Atkins,
Bag Lock,
Patented Feb. 17, 1836.
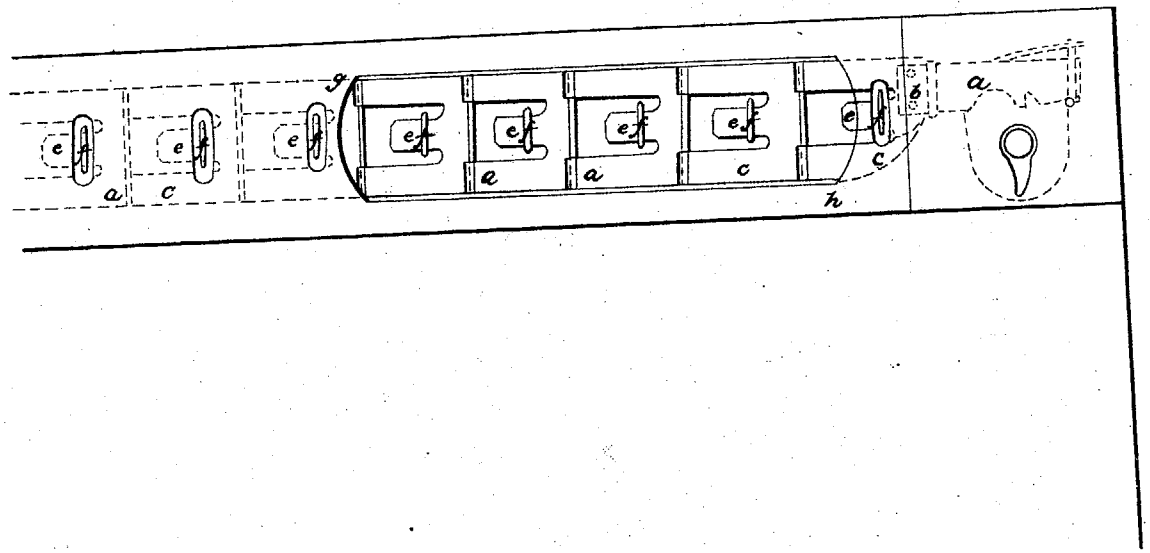
AM. PHOTO-LITHO. CO. N.Y. (OSBORNE'S PROCESS.)

Feb. 17, 1836 307

Ira Atkins of Hanover, New Hampshire

Letters Patent 9402X

The schedule referred to in these Letters patent and making part of the same
containing a description in the words of the said Ira Atkins himself of his im-
provement in the mail lock bolt for fastening mail bags valises &c.

---

To all to whom these presents shall come: Be it known that I, Ira Atkins of
Hanover, in the County of Grafton & State of N Hampshire Sadler have invented
a new & useful improvement in the mode of fastening mail bags, other bags, va-
lises & other articles to which it may be applied, by a bolt which I denominate
the "mail lock bolt" and the following is a full & exact description thereof.-
The improvement consists in a bolt & lock, which may be extended to any
required length & by its hinges be bent with the leather or other material of
which the bag or other article is made. It may also be adapted to straight
or curved openings. The construction will be understood by reference to the
drawing hereto annexed. The drawing represent a part of one side of a
small mail bag with a lock at the corner. the dotted lines on the lock (a)
represent the ordinary bolt of the lock at (b) the mail lock bolt commences
& is here represented as joined to the bolt of the lock with which it is moved
forward & backward by the key. It consists of a series of separate pieces (c)
united by hinges (d) each piece being cut in such a form, that the middle
part (e) shall serve as a short & separate bolt. These short bolts, when the whole
mail lock bolt is thrown forward by the key pass through the staples (f) which
as in the common mail bag are attached to the other fold of the bag, & the
bag is then locked when the mail lock is drawn back, these short bolts are
withdrawn from the staples & the bag is unlocked. In the drawing the ma-
terial of which the bag is made is represented as cut away in the space
from (g) to (h) so as to show the bolt. In other part the course of the bolt is
represented by dotted lines. The advantages to be derived from the use of
the mail lock bolt are 1st. greater despatch in opening & closing mail bags &c.
2d. superior neatness & compactness. 3d. the security of the staples from being
pressed out of place or shape by their not projecting above the surface of the bag. 4. Tightness by which the opening is closed against dust, moisture &c.
5. greater durability. What I claim as my invention & not previously known
is the aforesaid mail lock bolt that is to say, all the machinery & apparatus
described herein before & in the annexed drawing, excepting the common
lock bolt, & key by which the said mail lock is moved.
Dated & signed by me at Hanover aforesaid the 4th day of December
A.D. 1835.

Witnesses Ira Atkins
Ira Perley
John Dunmon

Drawing

[illegible] 5170 AW

[illegible]